(12) United States Patent
Krueger et al.

(10) Patent No.: US 6,360,885 B1
(45) Date of Patent: *Mar. 26, 2002

(54) MOBILE-DINING MEALHOLDER WITH BEVERAGE CONTAINER PLATE-LID

(75) Inventors: John A. Krueger, Milwaukee; Ronald A. Perez, Shorewood, both of WI (US)

(73) Assignee: Sparks International, Inc., Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/527,684

(22) Filed: Mar. 17, 2000

Related U.S. Application Data

(63) Continuation-in-part of application No. 09/441,847, filed on Nov. 17, 1999, now abandoned.

(51) Int. Cl.[7] ........................ A45C 11/20; A47G 19/02; B65D 21/02
(52) U.S. Cl. ........................ 206/217; 206/549; 206/564; 220/23.83; 220/575
(58) Field of Search ................................ 206/217, 541, 206/549, 557, 562, 563, 564; 220/23.83, 23.86, 574, 574.1, 575; D7/550.1, 552.1

(56) References Cited

U.S. PATENT DOCUMENTS

| | | |
|---|---|---|
| 4,732,274 A | 3/1988 | Bouton |
| 4,823,958 A | 4/1989 | Mahmud |
| 4,877,151 A | 10/1989 | Rush et al. |
| 4,938,373 A | 7/1990 | McKee |
| 5,058,737 A | 10/1991 | Patterson et al. |
| 5,060,820 A | 10/1991 | Boerner |
| 5,176,283 A | 1/1993 | Patterson et al. |
| 5,207,743 A | 5/1993 | Costarella et al. |
| 5,234,125 A | 8/1993 | Roberts |
| 5,240,136 A * | 8/1993 | Patterson et al. ............ 220/574 |
| 5,249,700 A | 10/1993 | Dumke |
| 5,292,028 A | 3/1994 | Patterson et al. |
| 5,294,000 A | 3/1994 | Yanuzzi |
| 5,346,070 A | 9/1994 | McSpadden |
| 5,381,901 A | 1/1995 | Hundley |
| 5,385,255 A | 1/1995 | Varano et al. |
| 5,390,798 A | 2/1995 | Yanuzzi |
| 5,441,164 A | 8/1995 | Beck et al. |
| 5,538,154 A | 7/1996 | Von Holdt |
| 5,593,062 A * | 1/1997 | Martin ..................... 220/574.1 |
| D381,866 S * | 8/1997 | St. Gelais ..................... D7/400 |
| 5,662,240 A * | 9/1997 | Norris ......................... 220/574 |
| 5,695,052 A | 12/1997 | Damato |
| 5,722,558 A | 3/1998 | Thompson |
| 5,727,678 A | 3/1998 | Chen |
| 5,954,195 A | 9/1999 | Krueger et al. |
| 5,984,131 A * | 11/1999 | Krueger et al. ............. 220/574 |

* cited by examiner

*Primary Examiner*—Bryon P. Gehman
(74) *Attorney, Agent, or Firm*—Jansson, Shupe & Munger, Ltd.

(57) ABSTRACT

A mobile-dining mealholder including a plate-lid and detachable beverage cup, the cup having a lip with an annular bead thereabout projecting radially to form a lower surface and the plate-lid including (a) a lid portion overlying the lip and terminating in a downward skirt having an inner surface with a necked-in portion around the skirt engaging the bead to provide snap-fit sealing, and (b) a tray portion having food-holding areas spaced about the lid portion, the cup, plate-lid, bead and skirt being configured and arranged to sealing engagement despite food-loading and usage forces. Food-receiving depressed regions have vertically-extending portions positioned and arranged tranversely with respect to pivot lines on the tray portion in order to avoid excessive flexing under food and dining loads.

44 Claims, 10 Drawing Sheets

MOBILE-DINING MEALHOLDER WITH BEVERAGE CONTAINER PLATE-LID

RELATED APPLICATIONS

This is a continuation-in-part of patent application Ser. No. 09/441,847, filed on Nov. 17, 1999 by the inventors named herein, and now abandoned.

FIELD OF THE INVENTION

This invention is related generally to the field of disposable dishware for serving foods and beverages—and, more particularly, to the field of combined cup and tray devices for portable use by persons who are consuming meals while "on the go."

BACKGROUND OF THE INVENTION

In the field of prepared-food service and dining, it is very common today for restaurants and other prepared-food outlets to serve people meals, typically made up of one or more food items together with a beverage, in or on disposable containers and/or food-holders of various types (e.g., disposable cups, plates, cartons, trays, wraps, etc.). This is typically done in what is referred to as the "fast-food" industry.

Diners involved in today's fast-paced living often are not seated at tables which provide horizontal surfaces on which to set their filled containers and/or food-holders. Instead, they are in situations in which no tabletop or the like is available and find themselves standing, driving, or engaged in activities in which it is helpful or required to have at least one hand free for some purpose.

For example, fast-food restaurants, particularly those having a "drive-through" capability, usually serve a typical customer the customer's selection of one to three solid food items (e.g., hamburgers or other sandwiches, french fries, onion rings, tacos, pieces of pie) along with a selected beverage (e.g., milkshakes, carbonated beverages, fruit juice or coffee). Sometimes the vehicle driver, particularly if he or she is alone, may find it necessary to hold both the food and the beverage with one hand, while keeping the other hand free for steering and/or other vehicle operations.

Another example is the widely-used practice at many parties and social functions of serving each guest one or more food items on a plate along with a hot or cold beverage in a cup (or the like). If a table or other horizontal support surface is unavailable, the guest may try using the hand which is holding the beverage container to move food from the plate to his or her mouth. Or, the guest sometimes attempts to balance the beverage container on the plate in order to free one hand for eating or some other purpose, such as opening a door or shaking hands with another person. Such practices often tend to be awkward, and can frequently result in spillage and other undesirable consequences. The same sort of problem is frequently encountered at sporting events and other entertainment events where refreshments are consumed by people with no table nearby, regardless of whether the people may be standing or sitting while eating.

The prior art includes many typically-disposable dishware and/or cup-plate combinations. However, prior devices fail to adequately solve the continuing problems faced by persons consuming meals "on the go." A number of specific disadvantages and shortcomings characterize the prior art, as will be seen by reference to various prior United States patents.

U.S. Pat. No. 5,060,820 (Boerner) discloses a plate or tray which interfaces with a centrally-located beverage container via downward extensions from the tray which are either rigid or foldable and which extend along the beverage container. A person using the Boerner device grasps the extension(s) and the container simultaneously. This combination must be gripped in order to remain engaged, and it must be separated in order to drink.

U.S. Pat. No. 5,058,737 (Patterson et al.) discloses plate-and-glass assembly which allows a person to carry a plate and a centrally-located drinking glass in one hand. The plates and glasses are engaged by what might be referred to as rail, tab or wedge system on the underside of the plate which allows a beverage container to be slidably or twistably received to centrally support the plate. The combination, must be disengaged for drinking purposes, requires customized beverage containers with mating lugs—to engage lugs on the undersides of the plates. This combination is a complex and impractical device.

U.S. Pat. No. 5,176,283 (Patterson et al.) discloses another plate-and-glass assembly which allows a person to carry a plate and a centrally-located drinking glass in one hand. The plate has a U-shaped channel on it and the glass (beverage container) is slidably received into engagement with the plate around a portion of the container. The '283 patent includes a drinking straw port, and uses a straw as a means to prevent unintended disengagement of the combination. This device does not allow for a complete seal of the container. Furthermore, it is impractical and uneconomical to manufacture at least in that it requires "a holder fabricated as a separate component and subsequently attached to a plate."

U.S. Pat. No. 5,292,028 (Patterson et al.) discloses a number of complex plate-and-glass assemblies which allow a person to carry a plate and a centrally-located drinking glass in one hand. The plates and glasses are engaged by what might be referred to as rail, tab or wedge systems on the undersides of the plates which allow beverage containers (e.g., beverage cans) to be slidably or twistably received to centrally support the plate. The '028 patent includes a drinking straw port. These devices are complex multi-part devices which are impractical to manufacture and use.

U.S. Pat. No. 4,938,373 (McKee) discloses a plate which interfaces with a beverage container utilizing a press-fit V-type friction-engagement groove. The plate has a centrally-located upwardly-extending annulus which forms (1) the V-groove on the underside of the plate for frictional engagement with the container lip and (2) a female receptacle on the top of the plate within which to place the bottom of the cup (on top of the plate) or an ashtray. The plate has a central hole to receive a straw. When the container is engaged beneath the plate, the lack of a positive engagement may be problematic, particularly when substantial non-distributed loads are placed on edge portions of the plate. As with certain other prior art, the plate has no means for reinforcement to resist excessive flexing under non-distributed loads.

U.S. Pat. No. 5,207,743 (Costarella), U.S. Pat. No. 5,234,125 (Roberts) and U.S. Pat. No. 5,441,164 (Beck) disclose further combinations in which beverage containers fit within plates via holes through, or raised receptacles in, plates.

Mobile-dining mealholders used in various situations are susceptible to substantial downward loading forces, both from the weight of foodstuffs thereon and from movements which occur during dining. There is a need for an improved mobile-dining mealholder which is of a light weight favoring disposability but which (1) still functions to provide support against such downward loading forces, (2) has excellent detachable sealing engagement to avoid risks of beverage spilling, and (3) instills excellent user confidence with its support and containment functions during usage, even though held by only one hand. The following objects of the invention are indicative of various problems and shortcomings in the prior art.

OBJECTS OF THE INVENTION

It is an object of this invention to provide an improved mobile-dining mealholder and mealholder plate-lid overcoming problems and shortcomings of the prior art.

Another object of this invention is to provide an improved mobile-dining mealholder having a detachably-secured plate-lid and beverage container which are held in firm engagement together so that, even when the sole support for the mealholder is by the user's grasp of the beverage container, solid foodstuffs may be reliably and confidently supported on the plate-lid as dining proceeds.

Another object of the invention is to provide an improved mobile-dining mealholder having a detachably-secured plate-lid and beverage container which are held in reliable sealing engagement so that beverage leakage and spilling are prevented even during inattentive use by a person consuming a meal held by the mealholder.

Another object of the invention is to provide an improved mobile-dining mealholder plate-lid which is of one-piece construction and is easily manufactured and yet provides all of the above-mentioned advantages in detachable engagement with a beverage container.

Another object of the invention is to provide an improved mobile-dining mealholder plate-lid which, although made of an inexpensive thermoformed plastic piece, resists excessive flexing despite substantial vertical loads thereon from foodstuffs and from dining movements.

Still another object of the invention is to provide an improved mobile-dining mealholder having a plate-lid with a lid portion particularly suited to resist unintended disengagement of the beverage container and plate-lid.

Another object of of the invention is to provide an improved mobile-dining mealholder having a plate-lid with a lid portion resisting unintended disengagement of the beverage container and plate-lid caused by squeezing of the beverage container.

Another object of the invention is to provide an improved mobile-dining mealholder with the above-noted advantages and which is formed to accommodate foodstuffs and servings of characteristic shapes and sizes for easy serving presentation and for convenient control during mobile dining.

Still another object of the invention is to provide an improved mobile-dining mealholder with the above-noted advantages and which further serves to shield and maintain the heat of hot food served thereon.

Yet another object of this invention is to provide an improved mobile-dining mealholder allowing convenient control of solid footstuffs and simultaneous easy consumption of a beverage with minimal manual involvement.

Another object is to provide an improved mobile-dining mealholder having advantages as described above and further providing such advantages in a mealholder which accommodates beverage containers of varying selected sizes.

These and other objects of the invention will be apparent from the following descriptions and from the drawings.

SUMMARY OF THE INVENTION

This invention is an improved mobile-dining mealholder which overcomes a number of significant disadvantages, shortcomings and problems of mealholders of the prior art, and is a highly convenient tool usable, for example, by the fast-food industry and by people who are dining "on the go." The inventive mealholder has two principal parts—a beverage container and a plate-lid—which are detachably combined. The invention also involves the plate-lid for such combination.

More specifically, the mobile-dining mealholder of this invention includes a beverage cup (or "container") which has a lip with an annular bead thereabout, the bead projecting radially outwardly to form a lower surface, and a plate-lid of particular configuration for snap-fit 360° sealing engagement of the plate-lid and container lip. The plate-lid includes (a) a circular and horizontal lid portion overlying the lip of the container and (b) a tray portion extending outwardly from the lid portion and having horizontally-arranged food-holding areas spaced about the lid portion. The lid portion terminates in a downward annular skirt which extends to a lower edge and has an inner surface with an annular radially necked-in portion along and around the skirt. The necked-in portion engages the lower surface of the bead around the container to provide snap-fit sealing of the lid portion with the lip. The container and its bead and the plate-lid and its skirt are configured and arranged to maintain snap-fit sealing engagement despite food-loading and usage forces.

In highly preferred embodiments, the tray portion of the plate-lid extends outwardly from the lower edge of the skirt. Most preferably, the tray portion is integral with the lower edge of the skirt of the lid portion and the lid portion and tray portion are a single integral piece.

The tray portion of the plate-lid of the mobile-dining mealholder of this invention preferably includes at least one food-receiving depressed region formed therein, and most preferably a plurality of food-receiving depressed regions spaced about the lid portion. The food-receiving depressed regions can be specifically shaped to easily receive and hold specific foods.

In highly preferred embodiments, the tray portion, by virtue of the one or more depressed regions, has vertically-extending portions positioned and arranged such that, for each of a plurality of imaginary horizontal pivot lines across the tray portion and adjacent to the lid portion, at least one of the vertically-extending portions is transverse to the pivot line, thereby providing reinforcement against excessive flexing about such pivot line. The walls of the depressed regions, which of course have vertical components, typically form the vertically-extending portions.

Downward flexing/bending pressure is applied to whatever portion or portions of the tray carry food; the weight of the food imposes tends to flex or rotate the normally horizontal tray about a horizontal pivot line extending between the lid portion and the area to which the downward load is applied. The depressed region or regions is or are positioned and arranged such that at least one vertically-extending portion is transverse to such horizontal pivot line, and thereby serves to reinforce the tray portion to minimize bending of the tray portion generally around such pivot line.

Certain highly preferred embodiments of the type just described also include at least one rib formed in the tray portion, such rib or ribs being positioned and arranged on the tray portion of the plate-lid in a manner enhancing reinforcement against excessive flexing of the tray portion about at least one of the imaginary pivot lines.

The positioning and arrangement of the depressed region(s) themselves, or the positioning and arrangement of the depressed region(s) and ribbing taken together, provide important directionally-focused reinforcement for the purpose of making the mobile-dining mealholder of this invention function properly—both to support the meal and to accommodate miscellaneous vertical loading forces imposed on the tray portion during normal dining movements of the user. These important features allow the plate-lid to be thinner than would otherwise be the case.

In certain embodiments, a separate removable dome is placed over a particular depressed region. The dome has a dome edge portion for placement on the tray portion about the depressed region, and the depressed region has vertically-extending surfaces thereabout which are positioned to engage the dome edge portion in order to keep the dome in vertical alignment over the depressed region.

In certain preferred embodiments having a food-receiving depressed region, the depressed region has a specified depth based upon a selected foodstuff serving or portion to be received in it. The depressed region is formed to receive a serving which is particular in size or in size and shape. In certain of these embodiments, the depressed region has a boundary and includes at least one finger-access portion at the boundary which has a depth less than the specified depth. This facilitates pick-up of a food item in such depressed region.

In some preferred embodiments, a depressed region has an opening through it which serves to provide flexibility for positioning certain foodstuffs which, by virtue of their shapes (typically elongate shapes), may need to extend through and below the tray portion in order to be properly held by the tray portion. In such cases, one portion of the foodstuff is held in the depressed region and another portion extends below the tray portion. Examples of such foodstuffs are lollipops and bananas. Also, an opening within a depressed region may be utilized to accommodate a wrapping for a food item.

In certain preferred embodiments, the tray portion of the plate-lid has an outer edge and a vertically-extending edge portion formed along the outer edge. This itself provides some reinforcement against excessive flexing of the tray portion under loads imposed thereon. The most preferred embodiments will have both a vertically-extending edge portion and a plurality of food-receiving depressed regions configured and arranged to provide the aforementioned reinforcement against excessive flexing.

Certain embodiments having a vertically-extending edge portion formed along the outer edge also include a removable tray cover. The tray cover has a cover edge portion which is configured for placement on the plate-lid along the vertically-extending outer edge thereof, thereby to position the tray cover with respect to the tray portion.

In certain preferred embodiments of this invention, the outer edge of the tray portion includes a near edge and a far edge and the lid portion, rather than being centrally located on the tray portion, is located adjacent to the near edge. This arrangement enables the user to hold the beverage and food close to his or her body to facilitate drinking and eating, and this advantage is particularly achieved when the near edge is substantially straight.

In preferred embodiments of this invention, the lid portion of the plate-lid has downwardly-extending anti-collapse structure which is spaced radially inwardly from the skirt and the container lip at positions adjacent to the container. When a beverage container is engaged with the plate-lid, the anti-collapse structure is positioned closely adjacent to the inside wall of the container. In the event of any radial squeezing of the beverage container by the user, the anti-collapse structure serves to protect the snap-fit engagement from inadvertent disengagement. Such anti-collapse structure tends to allow the plate-lid to be made thinner than would otherwise be the case. In one preferred form, the downwardly-extending anti-collapse structure is a plurality of arcuately-spaced arcuate segments which together form an interrupted annulus.

In certain highly preferred embodiments of this invention, the plate-lid has two (or more) of the above-described downward annular skirts, each in the form described which facilitates engagement with a beverage container. The two or more annular skirts have different diameters to accommodate snap-fit engagement with beverage containers of different sizes. Most preferably, the annular skirt (or skirts) of greater diameter circumscribes the annular skirt (or skirts) of lesser diameter.

In most preferred embodiments of the invention, the lid portion of the plate-lid has a straw-receiving opening therethrough so that the user can gain access to the beverage within the beverage container.

This invention also involves the improved mealholder plate-lid as described above, which forms the major structure of the improved mealholder.

This invention provides a significant change and dramatic improvement in the manner in which "fast-food" meals are presented to people "on the go," including, for example, people who purchase "fast-food" meals using drive-through facilities. The invention provides an easy and convenient way to dine in those situations in which a tabletop (to support plates and other dishes) is unavailable.

The two principal parts of the mobile-dining mealholder of this invention are firmly engaged to one another so that, even though support of the mealholder is solely by the user's grasp of the beverage container, foodstuffs are reliably and confidently supported on the plate-lid during dining. Indeed, the invention provides a reliable sealing engagement which also resists beverage leakage and spilling despite inattentive use by a person consuming a meal. The plate-lid of this invention, even when made of a thin thermoformed plastic piece, as is preferred, serves to resist excessive flexing despite substantial vertical loads thereon from foodstuffs and from dining movements.

The plurality of food-receiving depressed regions in the plate-lids of preferred embodiments are not only formed to accommodate a variety of specific solid foods and types of foods, but they are configured and arranged to provide reinforcement against the excessive flexing (or collapse) which would otherwise be caused by such foods and by typical movements during eating. Specific forms of such plate-lids may readily accommodate, e.g., a burger, French fries and condiments (ketchup) or a variety of alternatives; other forms can accommodate, e.g., nachos and cheese. Virtually endless varieties are possible to provide mobile-dining mealholders which readily accommodate the needs of nearly any prepared food retailer and its customers.

As used herein, the term "mobile-dining," in describing a mealholder, refers to the ability to be carried easily in one hand by a person who is eating a meal without sitting down at a table. Of course, the mobile-dining mealholder of this invention may be used in other ways as well.

The use directional terms like "lower," "horizontally-arranged" and "vertically-extending" refer to the mobile-dining mealholder or its principal parts in their normal usage orientations—i.e., with the beverage container in an upright position. The term "vertically-extending," used in describing portions of the tray portion of the plate-lid, refers to the fact that there is a change in the vertical position; the term does not require that the portion in question itself be oriented at 90° to a horizontal plane. The term "outwardly" as used in referring to the relationship of the tray portion of the plate-lid to the lid portion of the plate-lid refers to an extension from the lid portion in a generally horizontal direction.

The term "annular" as used herein refers to a ring-like or encircling quality, but does not require continuity. Likewise, terms such as "therearound" and "thereabout" require existence all around something, even if not in continuous form.

The term "integral" used in describing the relationship of one portion of the plate-lid to another means that the portions are not just joined to one another, but are formed together, such as in a thermoforming or other plastic fabrication process.

The term "imaginary horizontal pivot lines" refers to a mathematical line; it is imaginary only in the sense that it does not involve any visible indication. The term "transverse," of course, means across or at an angle to something, but not necessarily at an angle of 90°.

The terms "near edge" and "far edge," used in reference to portions of the outer edge of the plate-lid, refer to the edges which are, respectively, closest to and farthest from the body of the user during dining.

The term "adjacent to," used in describing the positioning of the anti-collapse structure on the underside of the lid portion of the plate-lid, includes both positioning for contact with the inside surface of the beverage cup and positioning closely spaced from the inside surface of the cup. When closely spaced, the spacing is close enough that any more than minimal squeezing of the cup will cause the inner surface of the cup to move into contact with the the anti-collapse structure; specifically, the anti-collapse structure is close enough to resist squeezing which would otherwise be sufficient to cause disengagement of the beverage cup from the plate-lid.

DETAILED DESCRIPTIONS OF PREFERRED EMBODIMENTS

Figure 2:
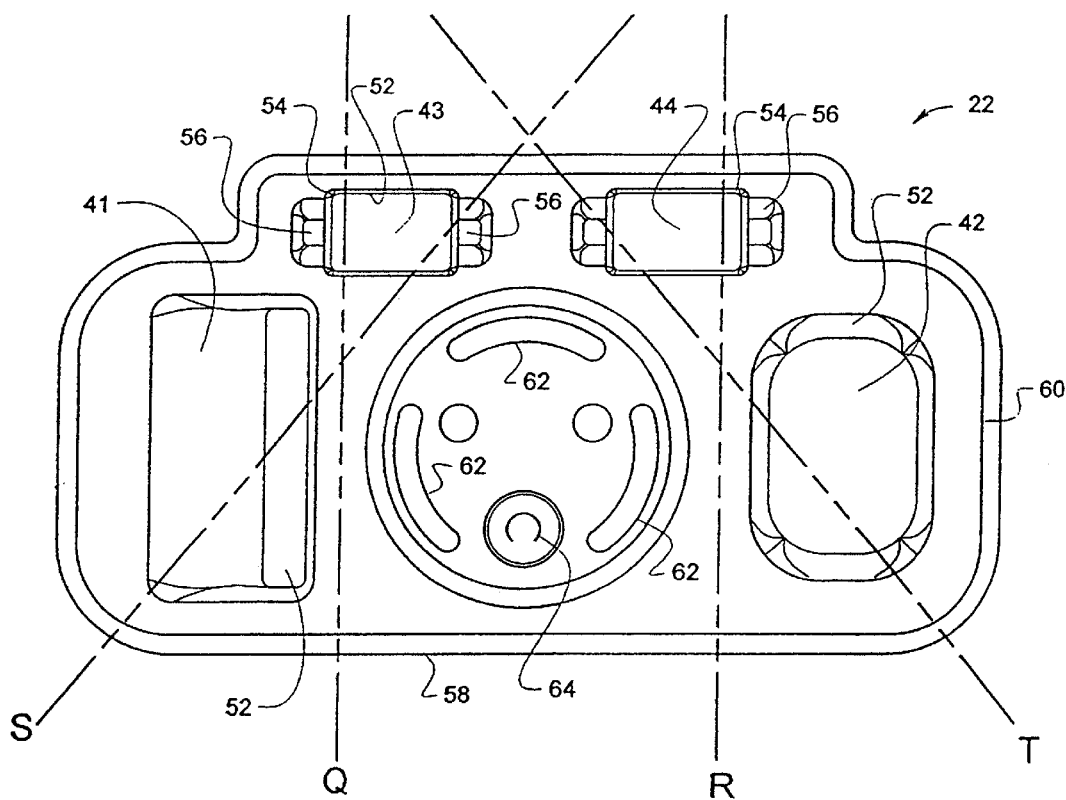
FIG. 2 is a plan view the device of FIG. 1.
Figure 3:
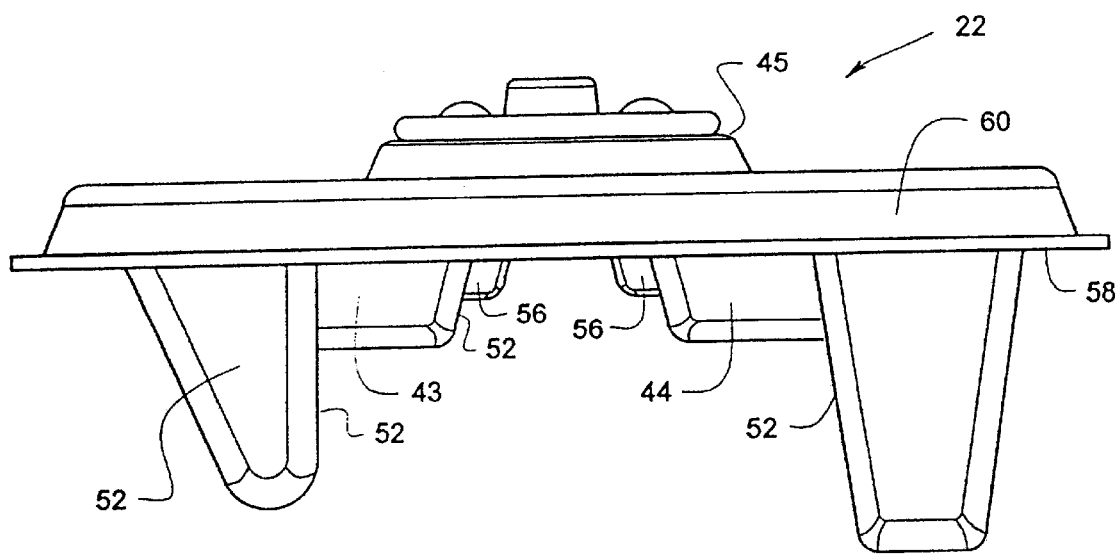
FIG. 3 is a front elevation view of the device FIG. 1 with the beverage container removed.
Figure 4:
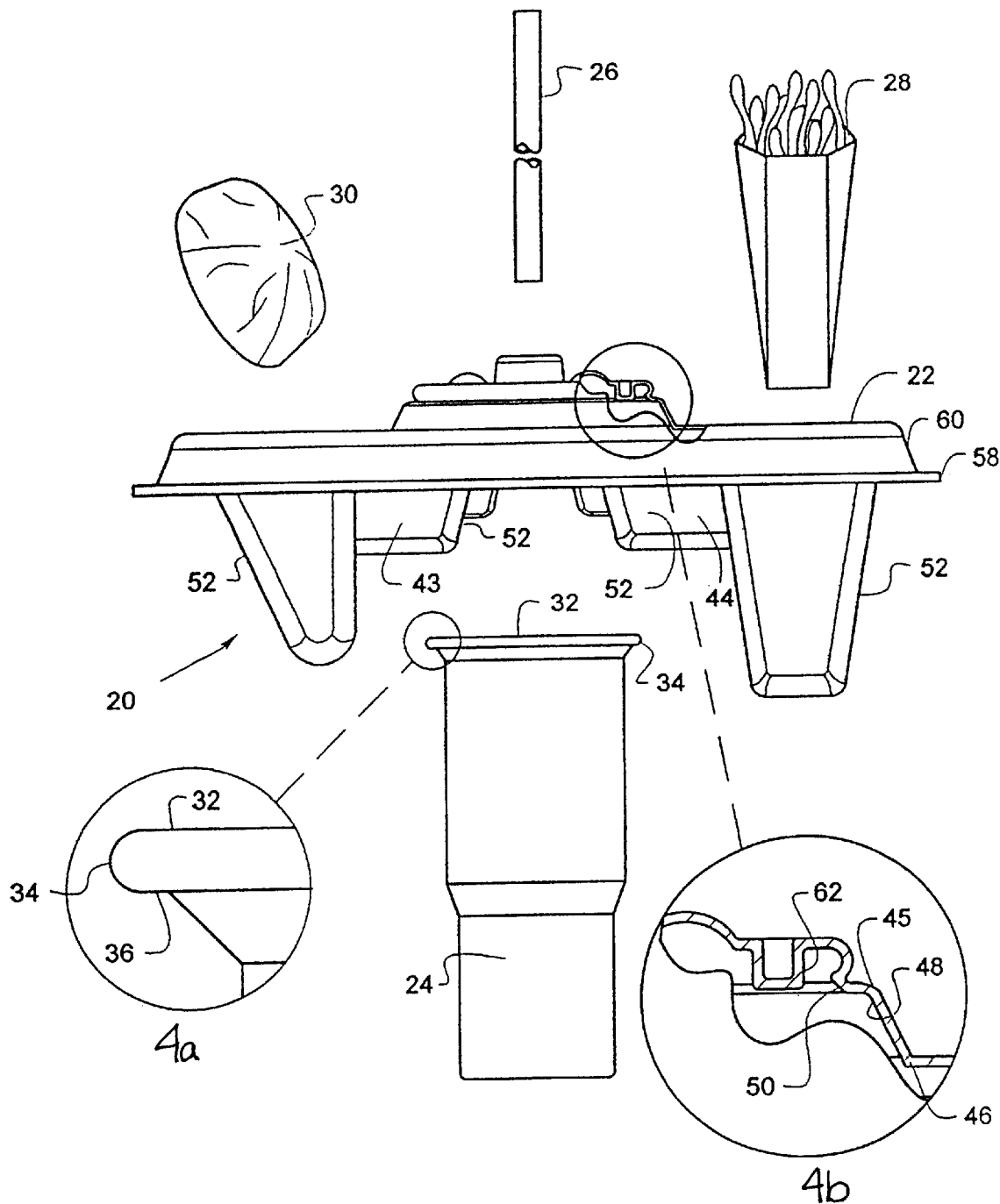
FIG. 4 is an exploded front elevation of the device of FIG. 1 showing food stuffs to be loaded thereon, and having partially cut-away and magnified sectional portions to illustrate certain details.

FIGS. 1–4 illustrate a mobile-dining mealholder 20 for use by fast-food restaurants, entertainment and sporting-event food vendors and the like where meals involving certain solid foodstuffs and a beverage are typically served to customers who will not be eating at tables. FIG. 4, an exploded view, shows the principal parts of mealholder 20—that is, plate-lid 22 and beverage cup 24, and also shows a straw 26, a cardboard packet 28 containing French fries, and a wrapped hamburger 30, each in position adjacent to where they will be received by plate-lid 22.

Beverage cup 24 has a lip 32 with an annular bead 34 along it. Annular bead 34 projects radially outwardly to form an annular lower surface 36 extending around cup 24. Beaded beverage cup 24 may be made of plastic materials, such as polyvinyl chloride (PVC), polyethylene or other plastics, using well-known forming methods—e.g., injection molding. Other materials, such as well-known paper-based materials, either coated or uncoated, may be used for beaded cup 24. Regardless of the material chosen, beverage cup 24 should have sufficient structural strength such that it can be used for holding/supporting the entire mobile-dining mealholder unit in one hand and such that it remains engaged with plate-lid 22.

Plate-lid 22 includes a lid portion 38 and a tray portion 40 which are integrally formed of plastic, such as by thermoforming as hereafter discussed. Lid portion 38 is circular and horizontal and overlies lip 32 of beverage cup 24. Tray portion 40 extends outwardly from lid portion 38 and has horizontally-arranged food-holding areas 41, 42, 43 and 44 which are spaced about lid portion 38.

Lid portion 38 terminates in a downward annular skirt 45 which extends to a lower edge 46 where tray portion 40 is integrally joined to lip portion 38. Annular skirt 45 has an inner surface 48, and inner surface 48 includes an annular radially necked-in portion 50 (see enlarged cross-sectional detail in FIG. 4) which extends along and around skirt 45 at a position just above and parallel to lower edge 46. Neckedin portion 50 engages lower surface 36 of bead 34 around cup 24 to provide snap-fit sealing of lid portion 38 with lip 32, such snap-fit providing 360° sealing engagement of plate-lid 22 with cup lip 32. Cup 24 and its bead 34 and plate-lid 22 and its skirt 45 are configured and arranged to maintain 360° snap-fit sealing engagement despite food-loading and usage forces.

Each of food-holding areas 41–44 is a food-receiving depressed region formed in tray portion 40 of plate-lid 22. Food-receiving depressed region 41 is formed to accommodate a hamburger or other sandwich, and may receive such foodstuff free of any other covering or packaging, or in a sandwich wrapping (e.g., of light paper or plastic) as illustrated by numeral 30 in FIG. 4, or in a formed container designed for insertion into depressed region 41. Food-receiving depressed region 42 is formed to accommodate another solid foodstuff such as the packet of French fries illustrated in FIG. 4. Of course, the French fries or other solid food may be placed in depressed region 42 without any packet or other packaging. Food-receiving depressed regions 43 and 44 are formed to receive condiments or other small servings of solid foods, such as ketchup, ketchup packets, candies or cookies. All of the food-receiving depressed regions can be specifically shaped to easily receive and hold specific foods.

Each of food-receiving depressed regions 41–44 has a plurality of vertically-extending portions (or surfaces) 52—the very surfaces which form the depressions. Food-receiving depressed regions 41–44, and their vertically-extending portions 52 are positioned and arranged to provide important reinforcement of tray portion 40. As illustrated best in FIG. 2, vertically-extending portions 52 are positioned and arranged such that, for a plurality of imaginary horizontal pivot lines such as phantom lines Q, R, S and T which extend across tray portion 40 in positions adjacent to lid portion 38, at least one of vertically-extending portions 52 transverse to each such pivot line. This, as earlier noted, provides important reinforcement against excessive flexing about such pivot lines.

Each food-receiving depressed region has a specified depth based on a selected foodstuff serving or portion intended to be received in it, and is formed to receive a serving of a particular size and/or shape. Depressed regions 43 and 44 have boundaries 54, and at its boundary 54 each of depressed regions 43 and 44 includes a pair of finger-access portions 56 with a depth which is less than the depth of the depressed region. Finger-access portions 56 facilitate the pick-up of a food item in the depressed region.

Figure 1:
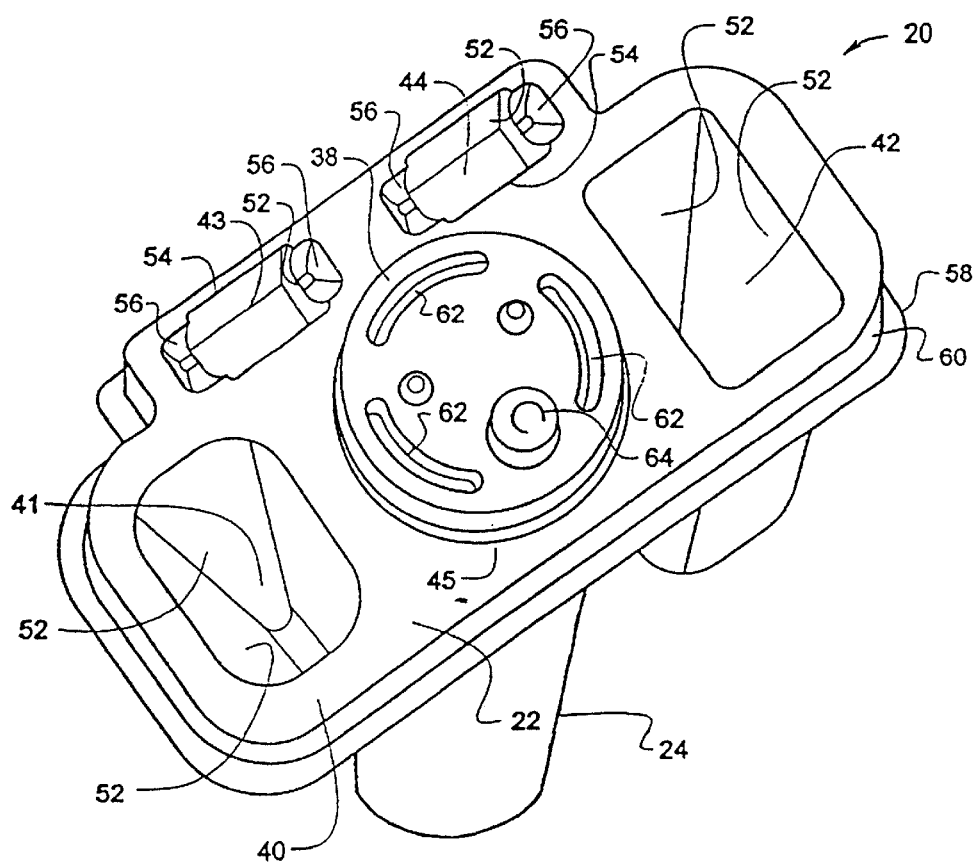
FIG. 1 is a perspective view of a preferred mobile-dining mealholder in accordance with this invention.

As seen best in FIGS. 1, 3 and 4, tray portion 40 has an outer edge 58 and vertically-extending edge portion 60 formed along outer edge 58. Vertically-extending edge portion 60 serves to provide reinforcement against excessive flexing of tray portion 40 under loads, as previously described.

Outer edge 58 of tray portion 40 includes a straight near edge 59 and an opposite far edge (unnumbered), with lid portion 38 being located adjacent to near edge 59. These factors better enable the user to hold the beverage and food close by to facilitate drinking and eating.

Referring again to lid portion 38, and directing particular attention to the FIGS. 1 and 2 and the enlarged cross-sectional detail portion of FIG. 4, it is seen that lid portion 38 of plate-lid 22 has downwardly-extending anti-collapse structure 62 which is spaced radially inwardly from skirt 45 and cup lip 32 at positions adjacent to the container—when cup 24 and plate-lid 22 are engaged. When beverage cup 24 and plate-lid 22 are engaged, anti-collapse structure 62 is positioned closely adjacent to the inside wall of the cup. As already noted, this serves to protect the snap-fit engagement from inadvertent disengagement, and allows plate-lid 22 to be made thinner than would otherwise be the case. As illustrated best in FIGS. 1 and 2, anti-collapse structure 62 is in the form of a plurality of arcuately-spaced arcuate segments which together form an interrupted annulus.

Lid portion 38 has a straw-receiving opening 64 through it to allow a user to gain access to the beverage without detaching beverage cup 24 from plate-lid 22.

Plate-lid 22 is preferably made by thermoforming of a flat sheet of plastic under appropriate temperatures and pressures, in known manner. Acceptable materials include acrylonitrile-butadiene-styrene copolymer (ABS), high-impact polystyrene (HIPS), high-density polyethylene (HDPE), high-molecular-weight polyethylene (HMWPE), polypropylene (PP), polyvinyl chloride (PVC), polymethyl methacrylate (or "acrylic") (PMMA) and polyethylene terephthalate modified with CHDM (PETG). Thermoforming of plate-lid 22 allows close tolerances, relatively thin final average thicknesses, sharp detailing, formed-in texture, formed-in logos and custom colors. The average thickness of plate-lid 22 is about 0.020 inch. Average thickness is preferably within the range of about 0.010–0.030 inch, and most preferably within the range of about 0.015–0.025 inch. Despite the thinness of plate-lid 22, its tray portion 40 can function well without excessive flexing due to the above-mentioned vertically-extending portions 52 and vertically-extending edge portion 60. Specific dimensions and design will depend on the specific intended usage.

Figure 5:
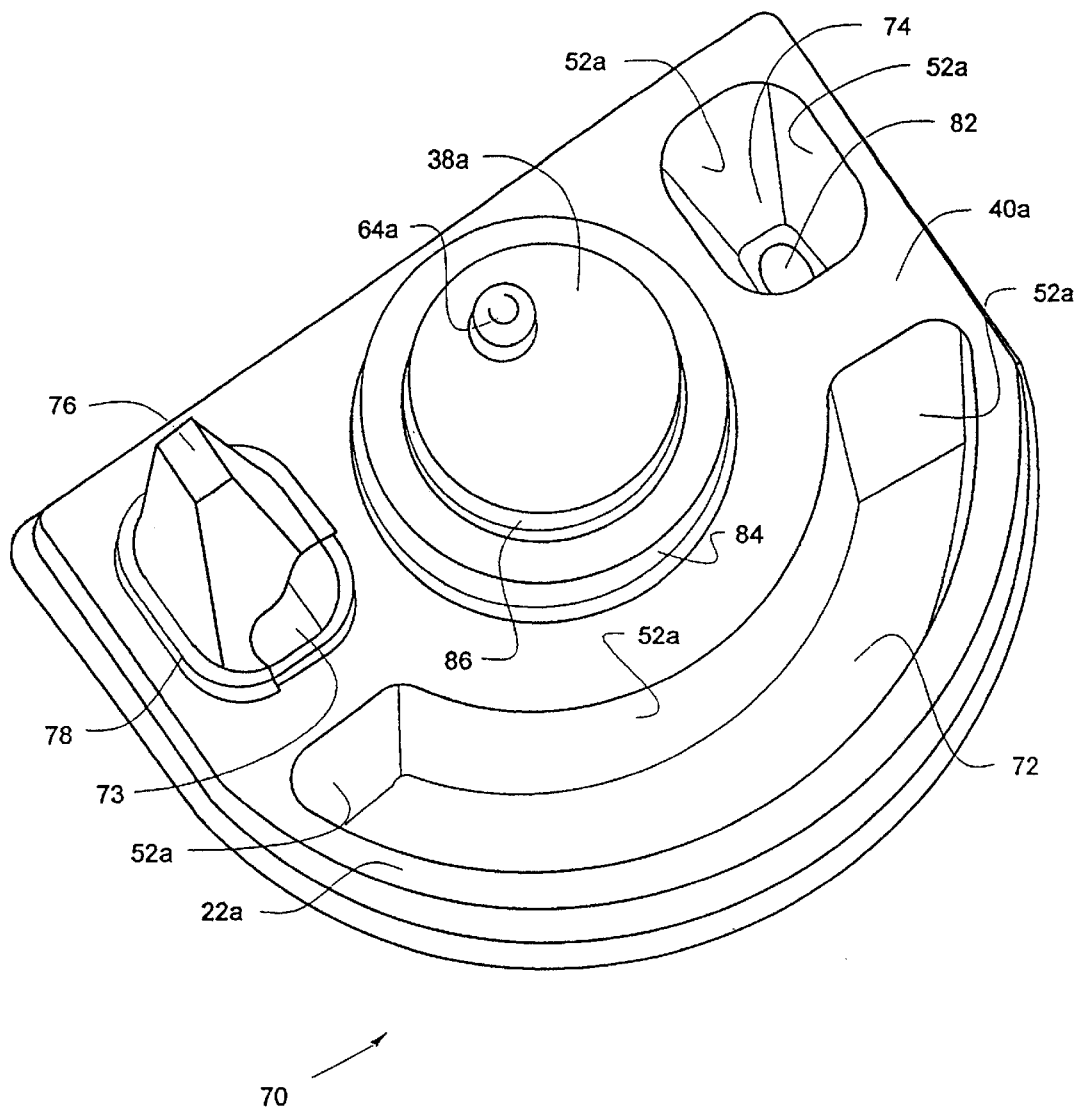
FIG. 5 is a perspective view of the plate-lid of another embodiment of this invention including a removable dome covering one of its food-receiving depressed regions, a portion of such figure being broken away.
Figure 6:
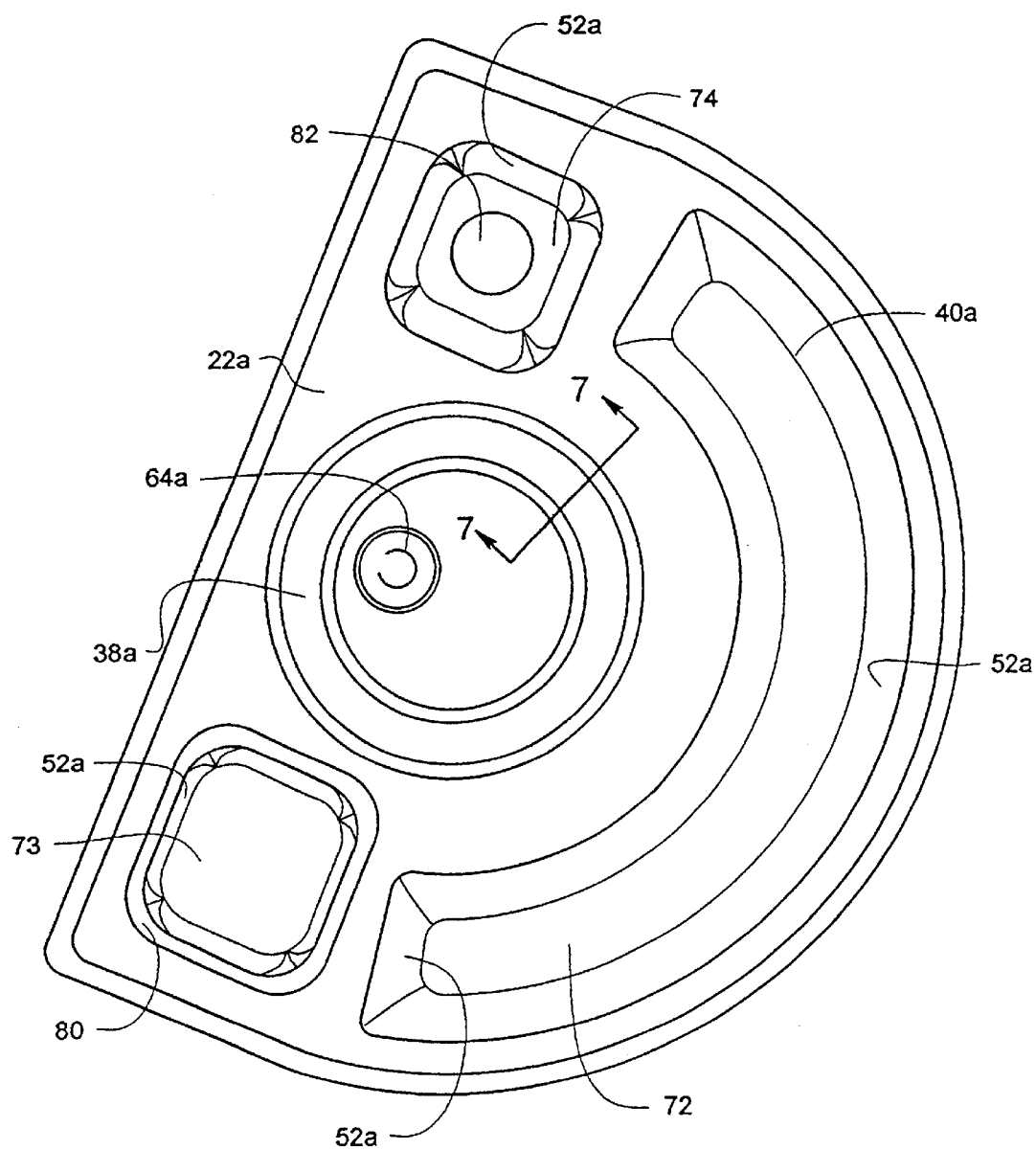
FIG. 6 is a plan view of the device of FIG. 5 with the dome removed.
Figure 7:
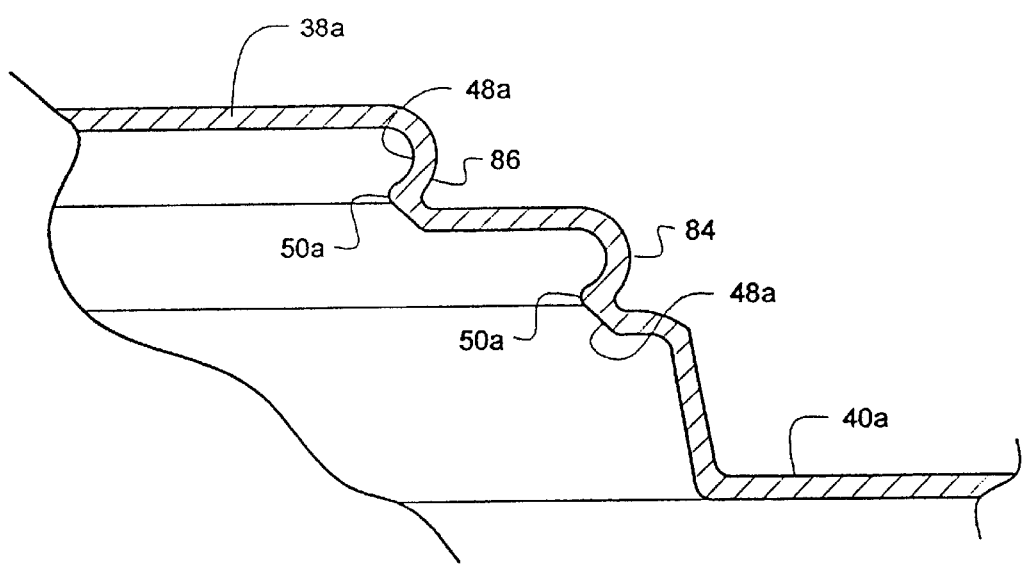
FIG. 7 is an enlarged fragmentary sectional view taken along section 7—7 as indicated in FIG. 6.

FIGS. 5–7 illustrate a mobile-dining mealholder 70 which is another embodiment of this invention—one that is useful, e.g., for nachos and cheese. In these figures, in many cases the same numerals as are used in FIGS. 1–4, together with the following letter "a," are used to identify parts, features and portions which are essentially the same as corresponding parts, features and portions of mealholder 20 of FIGS. 1–4.

As shown in FIGS. 5 and 6, mealholder 70 has a plate-lid 22a with a lid portion 38a and a tray portion 40a. Tray portion 40a has three food-receiving depressed regions (or "food-holding areas") 72, 73 and 74. Depressed region 72 is arcuate and fairly large, and can be used to contain nacho chips, while depressed regions 73 and 74 can be used, for example, for thick cheese dip and cookies, respectively, or other foodstuffs. Food-receiving depressed regions 72, 73 and 74 are configured and arranged so that their vertically-extending portions 52a are positioned to provide reinforcement of plate-lid 22a against excessive flexing about a plurality of pivot lines (not shown).

As shown in FIG. 5, depressed region 73 has a separate removable dome 76 over it, and serves to maintain the desired non-ambient temperature of food contained in depressed region 73, and to protect such food. For example, if hot cheese dip is in depressed region 73, it will retain its heat longer by virtue of the presence of dome 76. As seen in FIG. 5, dome 76 has a dome edge portion 78 for placement on the tray portion about depressed region 73. As seen best in FIG. 6, depressed region 73 has vertically-extending surfaces 80 thereabout which are positioned to engage dome edge portion 78 in order to keep removable dome 76 in vertical alignment over depressed region 73.

As seen in FIGS. 5 and 6, food-receiving depressed region 74 has an opening 82 through it at the bottom thereof This can serve to facilitate reception of certain foodstuffs or packaged foodstuffs by allowing a part thereof to extend through opening 82 to a position below plate-lid 22a.

As seen in FIGS. 5–7 but illustrated best in FIG. 7, plate-lid 22a has a lid portion 38a which has two downward annular skirts 84 and 86, each generally in the same form as annular skirt 45 of mealholder 20, as described above. Each of the skirts 84 and 86 has an inner surface 48a with a necked-in portion 50a. Necked-in portions 50a are each configured for snap-fit engagement with the lip bead of one of two beverage cups of different sizes (not shown). Outer annular skirt 84 is of greater diameter than inner annular skirt 86, and circumscribes inner annular skirt 86. A straw opening 64a is placed to allow access to whichever beverage cup is chosen for engagement with plate-lid 22a.

Figure 8:
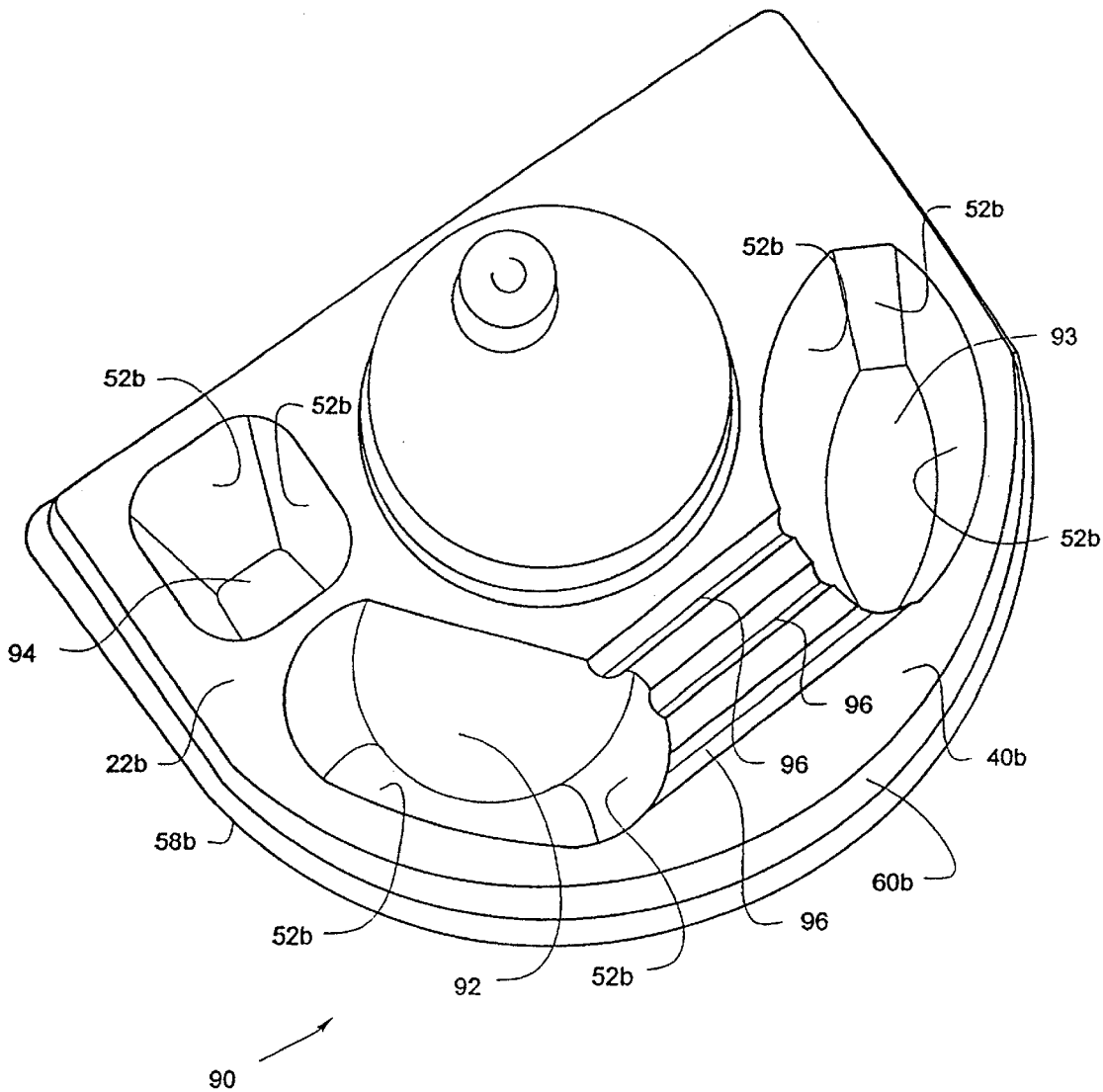
FIG. 8 is a perspective view of still another embodiment of this invention.
Figure 9:
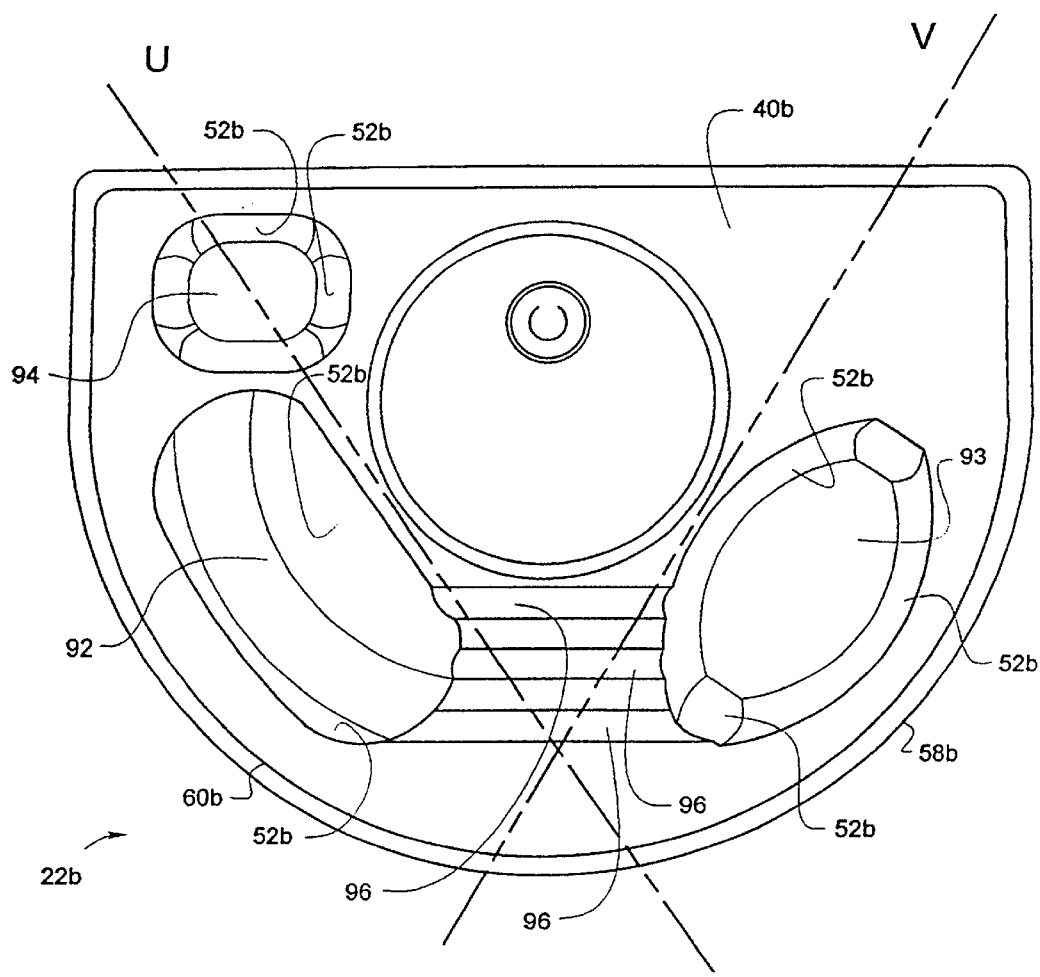
FIG. 9 is a plan view of the device of FIG. 8.

FIGS. 8–9 show a plate-lid 22b of still another mobile-dining mealholder 90 in accordance with this invention. In these figures, when numerals similar to those in other figures are used they are followed by the letter "b."

Plate-lid 22b of mealholder 90 has three food-receiving depressed regions 92, 93 and 94 in its tray portion 40b which are configured and arranged such that their vertically-extending portions 52b are positioned to provide reinforcement of plate-lid 22b against excessive flexing about plural pivot lines, such as horizontal lines U and V. Flexing is also resisted by the vertically-extending edge portions 60b of the outer edge 58b. In addition, extending between depressed regions 92 and 93 are a series of ribs 96 which are positioned and arranged on the tray portion 40b of plate-lid 22b in a manner enhancing reinforcement against excessive flexing about lines U and V.

Figure 10:
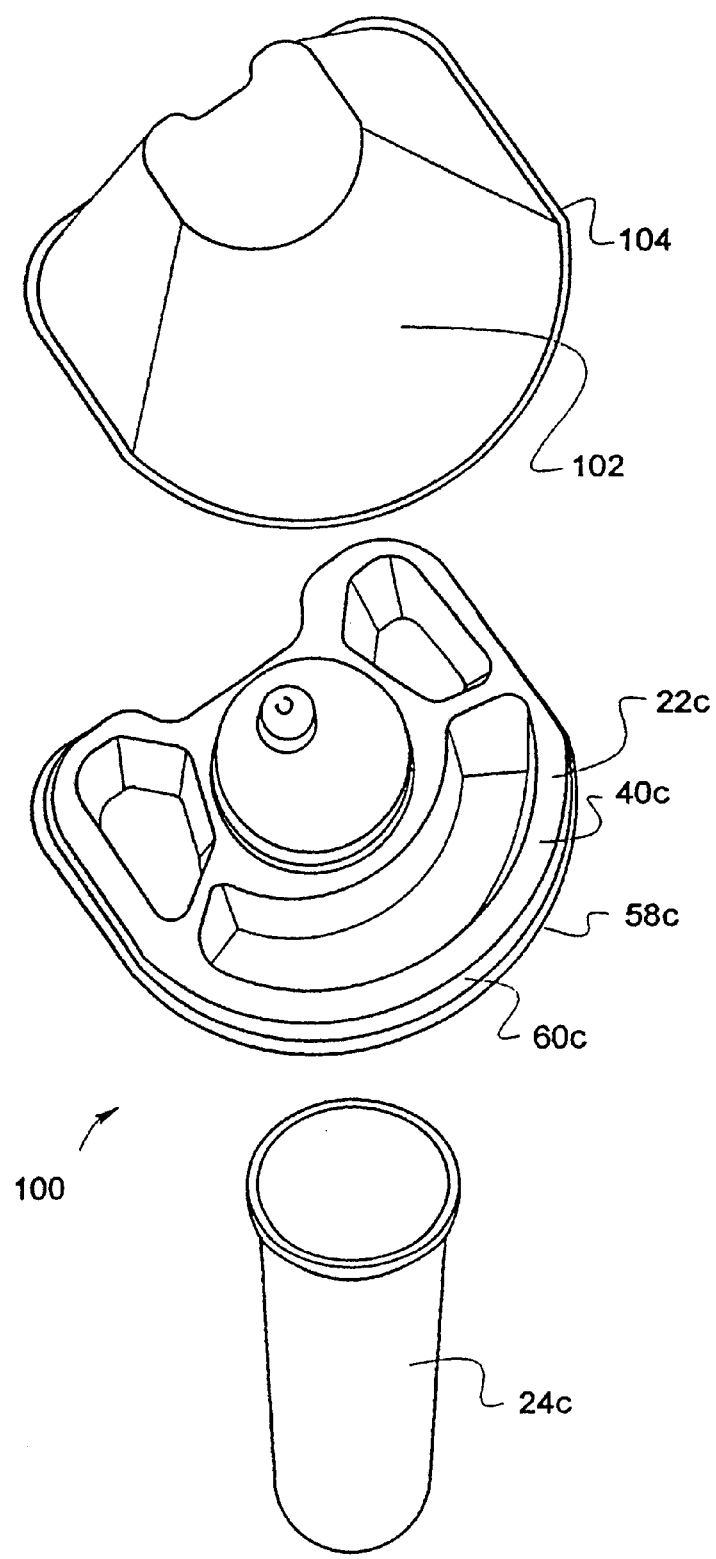
FIG. 10 is an exploded perspective view of yet another embodiment of this invention.

Finally, FIG. 10 shows yet another embodiment mealholder 100 in accordance with this invention. In this figure, when numerals similar to those in other figures are used they are followed by the letter "c." Mealholder 100 includes a cup 24c and a plate-lid 22c. Plate-lid 22c has a tray portion 40c which has an outer edge 58c with a vertically-extending edge portion 60c.

Mealholder 100 also includes a removable tray cover 102 which has an edge portion 104. Cover edge portion 104 is configured so that tray cover 102 can be placed on plate-lid 22c with cover edge portion 104 being along vertically-extending edge portion 60c. This positions tray cover 102 properly with respect to tray portion 40c, and helps tray cover 102 protect the foodstuffs on tray portion 40c and to keep them warm.

The plate-lids of the mobile-dining mealholders of this invention are, as already indicated, preferably formed by well-known thermoforming methods. However, other known fabrication methods, such as injection molding, can be used in manufacture of plate-lids in accordance with this invention.

The preferred thermoforming is best facilitated by appropriate design of the plate-lid, taking into account the depths of necessary draws, the angles of the aforementioned vertically-extending surfaces (which are preferably tapered for ease of thermoforming), and other factors. It is also helpful to design the plate-lid in a manner preventing excessive nesting in a stack of identical plate-lids. Anti-nesting features and characteristics can include the tapers which are utilized in the particular designs. Suitable features and characteristics to avoid excessive nesting are known in the thermoforming art.

While the principles of this invention have been described in connection with specific embodiments, it should be understood clearly that these descriptions are made only by way of example and are not intended to limit the scope of the invention.

What is claimed is:

1. In a mobile-dining mealholder having a beverage container and a plate-lid detachably combined, the improvement wherein:
   the beverage container is a cup having a lip with an annular bead thereabout, the bead projecting radially outwardly to form a lower surface;
   the plate-lid includes (a) a substantially circular and horizontal lid portion overlying the lip and terminating in a downward annular skirt which extends to a lower edge and has an inner surface with an annular necked-in portion along and around the skirt, the lower edge and the necked-in portion of the lid portion and the bead of the cup being dimensioned for snap-fit sealing engagement by relative axial motion of the cup and plate-lid such that the bead rides over the lower edge during the axial motion, and (b) a tray portion extending outwardly from the lid portion and having horizontally-arranged food-holding areas spaced about the lid portion; and
   the container, plate-lid, bead and skirt are configured and arranged to maintain snap-fit sealing engagement despite food-loading and usage forces.

2. The mobile-dining mealholder of claim 1 wherein the tray portion extends outwardly from the lower edge of the skirt.

3. The mobile-dining mealholder of claim 2 wherein the tray portion is integral with the lower edge of the skirt of the lid portion and the lid portion and tray portion are a single integral piece.

4. The mobile-dining mealholder of claim 1 wherein the tray portion includes at least one food-receiving depressed region formed therein.

5. The mobile-dining mealholder of claim 4 wherein the tray portion, by virtue of the at least one depressed region, has vertically-extending portions positioned and arranged such that, for each of a plurality of imaginary horizontal pivot lines across the tray portion and adjacent to the lid portion, at least one of the vertically-extending portions is transverse to each pivot line, thereby providing reinforcement against flexing about each pivot line.

6. The mobile-dining mealholder of claim 4 further including a separate removable dome over the at least one depressed region, the dome having a dome edge portion for placement on the tray portion about the at least one depressed region, the at least one depressed region having vertically-extending surfaces thereabout positioned to engage the dome edge portion to keep the dome in vertical alignment over the at least one depressed region.

7. The mobile-dining mealholder of claim 4 wherein the at least one depressed region has a specified depth based upon a selected foodstuff serving to be received therein.

8. The mobile-dining mealholder of claim 7 wherein the at least one depressed region has a boundary and includes at least one finger-access portion at the boundary, the finger-access portion having a depth less than the specified depth.

9. The mobile-dining mealholder of claim 7 wherein the at least one depressed region has an opening therethrough thereby to provide flexibility for positioning foodstuffs.

10. The mobile-dining mealholder of claim 4 including a plurality of the food-receiving depressed regions spaced about the lid portion.

11. The mobile-dining mealholder of claim 10 wherein the tray portion, by virtue of the plurality of depressed regions, has vertically-extending portions positioned and arranged such that, for each of a plurality of imaginary horizontal pivot lines across the tray portion and adjacent to the lid portion, at least one of the vertically-extending portions is transverse to each pivot line, thereby providing reinforcement against flexing about each pivot line.

12. The mobile-dining mealholder of claim 11 further including at least one rib formed in the tray portion and positioned and arranged thereon to enhance reinforcement against flexing about at least one of the imaginary pivot lines.

13. The mobile-dining mealholder of claim 1 wherein the tray portion has an outer edge and a vertically-extending edge portion formed therealong, thereby to provide reinforcement against flexing of the tray portion under loads imposed by food thereon.

14. The mobile-dining mealholder of claim 13 wherein the tray portion includes at least one food-receiving depressed region formed therein, thereby providing further reinforcement against flexing of the tray portion under loads imposed by food thereon.

15. The mobile-dining mealholder of claim 14 wherein the tray portion, by virtue of the at least one depressed region, has vertically-extending portions positioned and arranged such that, for each of a plurality of imaginary horizontal pivot lines across the tray portion and adjacent to the lid portion, at least one of the vertically-extending portions is transverse to each pivot line, thereby providing reinforcement against flexing about each pivot line.

16. The mobile-dining mealholder of claim 14 including a plurality of the depressed regions positioned and arranged about the lid portion and wherein the tray portion, by virtue of the plurality of depressed regions, has vertically-extending portions positioned and arranged such that, for each of a plurality of imaginary horizontal pivot lines across the tray portion and adjacent to the lid portion, at least one of the vertically-extending portions is transverse to each pivot line, thereby providing reinforcement against flexing about each pivot line.

17. The mobile-dining mealholder of claim 16 further including at least one rib formed in the tray portion and positioned and arranged thereon to enhance reinforcement against flexing about at least one of the imaginary pivot lines.

18. The mobile-dining mealholder of claim 13 further including a removable tray cover having a cover edge portion configured for placement on the tray portion along the vertically-extending outer edge thereof, thereby to position the tray cover with respect to the tray portion.

19. The mobile-dining mealholder of claim 13 wherein the outer edge includes a near edge and a far edge and the lid portion is adjacent to the near edge.

20. The mobile-dining mealholder of claim 19 wherein the near edge is substantially straight, thereby enabling the user to hold the beverage and food nearby to facilitate drinking and eating.

21. The mobile-dining mealholder of claim 1 wherein the lid portion has downwardly-extending anti-collapse structure spaced radially inwardly from the skirt inner surface at positions adjacent to the container lip, the anti-collapse structure being positioned to protect snap-fit engagement during squeezing of the beverage container.

22. The mobile-dining mealholder of claim 21 wherein the downwardly-extending anti-collapse structure comprises spaced arcuate segments which together form an interrupted annulus.

23. The mobile-dining mealholder of claim 1 wherein the plate-lid has two of said downward annular skirts, the annular skirts having different diameters to accommodate snap-fit engagement with beverage containers of different sizes.

24. The mobile-dining mealholder of claim 23 wherein the annular skirt of greater diameter circumscribes the annular skirt of lesser diameter.

25. The mobile-dining mealholder of claim 1 wherein the lid portion of the plate-lid has a straw-receiving opening therethrough to gain access to the beverage.

26. In a mealholder plate-lid for detachable combination with a beverage container having a lip to form a mobile-dining mealholder, the improvement wherein the plate-lid comprises:
 a substantially circular and horizontal lid portion for overlying the lip and terminating in a downward annular skirt which extends to a lower edge and has an inner surface with an annular necked-in portion along and around the skirt, the necked-in portion positioned to engage the lower surface of a bead along the container lip to provide snap-fit sealing of the lid portion with the lip, the lid portion having a straw-receiving opening therethrough to gain access to the beverage; and
 a tray portion integral with the lid portion, extending outwardly therefrom and having horizontally-arranged food-holding areas spaced about the lid portion; and
 the plate-lid and skirt being configured and arranged to maintain snap-fit sealing engagement with the bead despite food-loading and usage forces on the plate-lid.

27. The mealholder plate-lid of claim 26 wherein the tray portion extends outwardly from the lower edge of the skirt.

28. The mealholder plate-lid of claim 26 wherein the tray portion includes at least one food-receiving depressed region formed therein.

29. The mobile-dining mealholder of claim 28 wherein the tray portion, by virtue of the at least one depressed region, has vertically-extending portions positioned and arranged such that, for each of a plurality of imaginary horizontal pivot lines across the tray portion and adjacent to the lid portion, at least one of the vertically-extending portions is transverse to each pivot line, thereby providing reinforcement against flexing about each pivot line.

30. The mealholder plate-lid of claim 28 including a plurality of the food-receiving depressed regions spaced about the lid portion.

31. In a mealholder plate-lid for detachable combination with a beverage container having a lip to form a mobile-dining mealholder, the improvement wherein the plate-lid comprises:
 a substantially circular and horizontal lid portion for overlying the lip and terminating in a downward annular skirt which extends to a lower edge and has an inner surface with an annular necked-in portion along and around the skirt, the necked-in portion positioned to engage the lower surface of a bead along the container lip to provide snap-fit sealing of the lid portion with the lip; and
 a tray portion integral with the lid portion, extending outwardly therefrom and having horizontally-arranged food-holding areas spaced about the lid portion, including a plurality of food-receiving depressed regions spaced about the lid portion; and
 the plate-lid and skirt being configured and arranged to maintain snap-fit sealing engagement with the bead despite food-loading and usage forces on the plate-lid; whereby the tray portion, by virtue of the plurality of depressed regions, has vertically-extending portions positioned and arranged such that, for each of a plurality of imaginary horizontal pivot lines across the tray portion and adjacent to the lid portion, at least one of the vertically-extending portions is transverse to each pivot line, thereby providing reinforcement against flexing about each pivot line.

32. The mobile-dining mealholder of claim 31 further including at least one rib formed in the tray portion and positioned and arranged thereon to enhance reinforcement against flexing about at least one of the imaginary pivot lines.

33. The mealholder plate-lid of claim 31 wherein the tray portion has an outer edge and a vertically-extending edge portion formed therealong, thereby to provide further reinforcement against flexing of the tray portion under loads imposed by food thereon.

34. The mealholder plate-lid of claim 33 wherein the outer edge includes a near edge and a far edge and the lid portion is adjacent to the near edge.

35. The mealholder plate-lid of claim 34 wherein the near edge is substantially straight, thereby enabling the user to hold the beverage and food nearby to facilitate drinking and eating.

36. In a mealholder plate-lid for detachable combination with a beverage container having a lip to form a mobile-dining mealholder, the improvement wherein the plate-lid comprises:
 a substantially circular and horizontal lid portion for overlying the lip and terminating in a downward annular skirt which extends to a lower edge and has an inner surface with an annular necked-in portion along and around the skirt, the necked-in portion positioned to engage the lower surface of a bead along the container lip to provide snap-fit sealing of the lid portion with the lip; and
 a tray portion integral with the lid portion, extending outwardly therefrom and having horizontally-arranged food-holding areas spaced about the lid portion;

the plate-lid and skirt being configured and arranged to maintain snap-fit sealing engagement with the bead despite food-loading and usage forces on the plate-lid; and the lid portion having downwardly-extending anti-collapse structure spaced radially inwardly from the skirt and the container lip at positions adjacent to the container, the anti-collapse structure being positioned to protect snap-fit engagement during squeezing of the beverage container.

37. The mobile-dining mealholder of claim 36 wherein the downwardly-extending anti-collapse structure comprises spaced arcuate segments which together form an interrupted annulus.

38. In a mealholder plate-lid for detachable combination with a beverage container having a lip to form a mobile-dining mealholder, the improvement wherein the plate-lid comprises:

a substantially circular and horizontal lid portion for overlying the lip and terminating in first and second downward annular skirts which extend to respective lower edges and have respective inner surfaces with annular necked-in portions along and around each skirt, each necked-in portion positioned to engage the lower surface of a bead along the container lip to provide snap-fit sealing of the lid portion with the lip, the annular skirts having different diameters to accommodate snap-fit engagement with beverage containers of different sizes;

a tray portion integral with the lid portion, extending outwardly therefrom and having horizontally-arranged food-holding areas spaced about the lid portion; and the plate-lid and skirts being configured and arranged to maintain snap-fit sealing engagement with the bead despite food-loading and usage forces on the plate-lid.

39. The mobile-dining mealholder of claim 38 wherein the annular skirt of greater diameter circumscribes the annular skirt of lesser diameter.

40. In a mobile-dining mealholder having a beverage container and a plate-lid detachably combined, the improvement wherein:

the beverage container is a cup having a lip portion;

the plate-lid includes (a) a substantially circular and horizontal lid portion overlying the lip portion and terminating in a downward annular skirt which is detachably engageable with the lip portion, and (b) a tray portion extending outwardly from the lid portion and having horizontally-arranged food-holding areas spaced about the lid portion and a plurality of food-receiving depressed regions formed therein, wherein by virtue of the depressed regions the tray portion has vertically-extending portions positioned and arranged such that, for each of a plurality of imaginary horizontal pivot lines across the tray portion and adjacent to the lid portion, at least one of the vertically-extending portions is transverse to each pivot line, thereby providing reinforcement against flexing about each pivot line.

41. The mobile-dining mealholder of claim 40 further including at least one rib formed in the tray portion and positioned and arranged thereon to enhance reinforcement against flexing about at least one of the imaginary pivot lines.

42. The mealholder plate-lid of claim 40 wherein the tray portion has an outer edge and a vertically-extending edge portion formed therealong, thereby to provide further reinforcement against flexing of the tray portion under loads imposed by food thereon.

43. The mealholder plate-lid of claim 42 wherein the outer edge includes a near edge and a far edge and the lid portion is adjacent to the near edge.

44. The mealholder plate-lid of claim 43 wherein the near edge is substantially straight, thereby enabling the user to hold the beverage and food nearby to facilitate drinking and eating.

* * * * *